Patented Feb. 8, 1949

2,461,038

UNITED STATES PATENT OFFICE 2,461,038

CHEMICAL COMPOSITIONS AND THE PREPARATION THEREOF

John W. Cusic, Skokie, Ill., assignor to G. D. Searle & Co., Skokie, Ill., a corporation of Illinois No Drawing. Application May 15, 1947,
Serial No. 748,333

12 Claims. (Cl. 260—570)

1

This invention relates to tertiary-amino-alkyl ethers of certain polynuclear compounds so formulated that the ether linkage of the polynuclear system is attached to a carbon atom whose properties are aliphatic in nature. More particularly it relates to tertiary-aliphatic-aminoalkyl ethers of 9-fluorenol and related cyclic carbinols.

This application is a continuation-in-part of my copending application, Serial No. 505,353, filed October 7, 1943, now abandoned.

The ethers which comprise my invention have the following general structural formula:

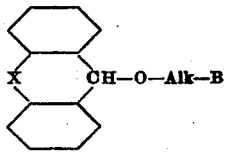

wherein X represents O, S, methylene or a single bond, Alk represents an alkylene radical and B represents a tertiary aliphatic-type amino group.

When X is O, a 9-xanthyl ether results; when X is S, a 10-thioxanthyl ether is represented; when X is a methylene radical, a 9,10-dihydro-9-anthryl ether is shown; and when X is a single bond, a 9-fluorenyl ether is disclosed.

Among the alkylene radicals which Alk represents are ethylene, propylene, 1,2- and 2,3-butylene, amylene, and similar lower alkylene radicals. The tertiary aliphatic-type amino radicals represented by B include amino radicals derived from secondary organic amines having ionization constants in the range of $10^{-3}$ to $10^{-6}$. They therefore include amino radicals such as the dialkyl-amino radicals wherein the alkyl groups may be the same or different, aliphatic-type cyclic amino radicals such as piperidine, pyrrolidine, morpholine, thiomorpholine and alkyl derivatives of cyclic amines such as 2-methylpiperidine, 2-methylpyrrolidine, 2-ethylpiperidine, 2,6-dimethylpiperidine, 2-methylmorpholine, and the like.

The prior art discloses several alkylaminoalkyl ethers of aromatic bodies in which the ether group is directly attached to a mono- or polynuclear aromatic radical, which may be unsubstituted or carry further substitutions, and which have been reported to be variously useful as antiseptics, in heart disease, and the like. The prior art further discloses a series of amino-alcohol esters of acids derived from the groups which I have used in this invention by substitution of a carboxyl group at the point where I have introduced the ether linkage. However, so far as I am aware, it has not been previously known that ethers, particularly araliphatic ethers of the type herein described, are endowed with sufficient antispasmodic activity to render them useful in the practice of medicine.

2

The free bases which comprise this invention are high-boiling oils which are difficultly soluble in water but are soluble in most organic solvents. They form salts with one equivalent of an acid. These salts are readily soluble in water and sparingly soluble in most organic solvents. Among the acids which may be used to form salts of these bases are such inorganic acids as hydrochloric, sulfuric, phosphoric, sulfamic, and strong organic acids such as citric, tartaric, lactic, acetic, and similar acids which in therapeutic dosages provide non-toxic anions. It is to be understood that the appended claims include basic compounds claimed therein whether they be made or used as the free base or as a salt thereof.

The compounds to which this invention relates are potent antispasmodic agents, as shown by their ability to relax spasms of both muscular and nervous origin.

The compounds of this invention may be prepared by the interaction of the sodium salt of the corresponding polynuclear alcohol with an appropriate tertiary alkyl-aminoalkyl halide. In practice, I have found it convenient to carry out this reaction by heating together the alcohol, a salt of the alkylaminoalkyl halide, and dry powdered alkali.

The appended examples illustrate in more detail my invention, without, however, limiting it in spirit or in scope.

Example 1

16 grams of 9-fluorenol, 13 g. of beta-diethyl-aminoethyl chloride and 8 g. of powdered sodium hydroxide are thoroughly mixed and heated at 90–100° centigrade for 8–10 hours. The mass is diluted with water and extracted with ether. The ether extract is washed with water and dried with anhydrous sodium sulfate. The ether is removed by evaporation and the residue is distilled under reduced pressure. 9-fluorenol beta-diethyl-aminoethyl ether (I) distils at 180–190° C. at 8 millimeters pressure. Analysis of a sample of the base showed 5.06% nitrogen; the calculated value is 4.98%.

I 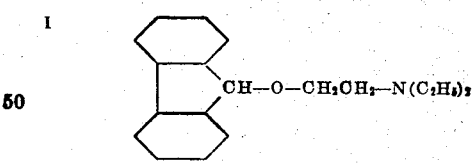

By similar reactions employing beta-dimethyl-aminoethyl chloride or beta-morpholinoethyl chloride or beta-piperidinoethyl chloride in place of beta-diethyl-aminoethyl chloride, there is obtained 9-fluorenyl beta-dimethylaminoethyl ether (II), 9-fluorenyl beta - morpholinoethyl ether (III) and 9-fluorenyl beta-piperidinoethyl ether (IV), respectively.

II

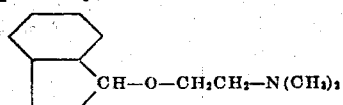

III

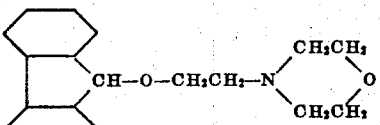

IV

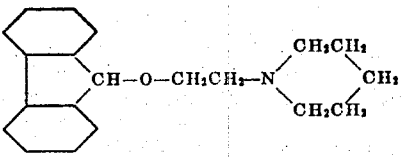

A solution of 9-fluorenyl beta-diethylaminoethyl ether (I) in dry ether is treated with an equivalent of alcoholic hydrogen chloride. The hydrochloride forms a sticky precipitate which is too hygroscopic to be isolated in crystalline form. The sulfate prepared in a similar fashion is oily.

To a solution of 20 g. of beta-diethylaminoethyl 9-fluorenyl ether in ether is added an excess of methyl iodide. After standing overnight at low temperature an oil settles out. This is removed and dried. It is converted to the methochloride by heating for 2 hours with about 1 liter of water containing 3 equivalents of fresh, well washed silver chloride. The mixture is filtered and an aqueous solution of 9-fluorenyl beta-diethylaminoethyl ether methochloride is so obtained.

*Example 2*

A mixture of 18.2 g. of 9-fluorenol, 19.1 g. of beta-di-n-butylaminoethyl chloride and 12 g. of powdered sodium hydroxide is heated for a day on a steam bath. 9-fluorenyl beta-di-n-butylaminoethyl ether (V) is isolated as in Example 1 and distils at 204–206° C. at 6 mm. Analysis of a sample of this base showed 4.34% nitrogen; calculated value is 4.15%.

This substance has the formula

V

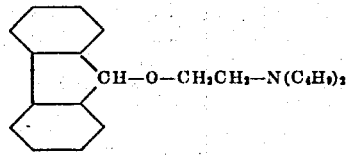

In a similar way, using beta-dipropylaminopropyl chloride or beta-methylpropylaminoethyl chloride in place of beta-di-n-butylaminoethyl chloride, there is obtained 9-fluorenyl beta-dipropylaminopropyl ether (VI) or 9-fluorenyl beta-methylpropylaminoethyl ether (VII).

VI

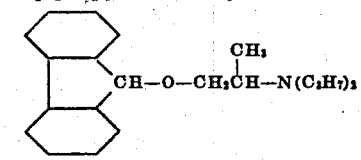

VII

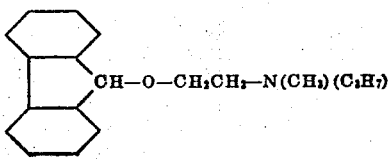

*Example 3*

A mixture of 14.5 g. of 9-fluorenol, 14.9 g. of gamma-diethylaminopropyl chloride and 8 g. of powdered sodium hydroxide is heated at 50–60° C. for 20 hours. 9-fluorenyl gamma-diethylaminopropyl ether (VIII) is isolated as in Example 1 and distils at 202–204° C. at 6 mm. The hydrochloride of this base is prepared as in Example 1 and is an oil.

It has the structural formula

VIII

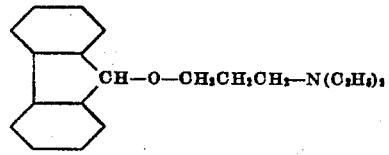

In a similar way, one can obtain 9-fluorenyl gamma-dimethylaminopropyl ether (IX) and 9-fluorenyl gamma-methylethylaminopropyl ether (X) by reacting 9-fluorenol with gamma-dimethylaminopropyl chloride and gamma-methylethylaminopropyl chloride, respectively, by the procedure given in the above example.

IX

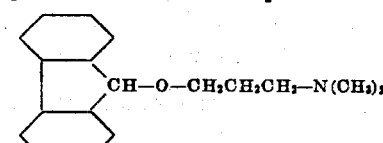

X

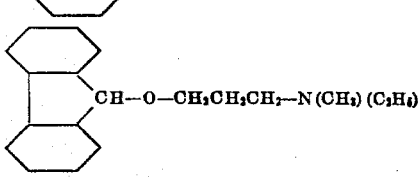

*Example 4*

0.1 mole of xanthone suspended in 150 cubic centimeters of alcohol is reduced under 30–50 pounds hydrogen pressure in the presence of Raney nickel and a small amount of sodium chloroplatinate until about 0.1 mole of hydrogen is taken up. The solution is filtered to remove catalyst, the filtrate is poured into water and the precipitate of the reduced product filtered and dried; M. P. 123–124° C.

19 g. of the carbinol thus obtained, 40.5 g. of beta-diethylaminoethyl chloride and 16 g. of powdered sodium hydroxide are mixed and heated on a steam bath for a day. The reaction mass is taken up in dilute hydrochloric acid and extracted with ether. The acid solution is made alkaline and extracted with ether. This ether extract is washed with water, dried with sodium sulfate and evaporated. The residue is distilled at 184–186° C. at 6 mm. An ether solution of the distilled base, on treatment with alcoholic hydrogen chloride, gives a solid which, after crystallization from methyl ethyl ketone, melts at 176–180° C.

*Example 5*

0.1 mole of anthrone in 150 cc. of alcohol is reduced at 30–50 lbs. hydrogen pressure in the presence of Raney nickel and a trace of sodium chloroplatinate. About 0.3 mole of hydrogen is taken up in three hours. The solution is filtered, poured into cold water, and the reduction product is collected, washed and dried; M. P. 77–78° C.

19 g. of the reduction product, which is a 9-hydroxy-polyhydroanthracene, 27 g. of beta-diethylaminoethyl chloride, and 16 g. of powdered sodium hydroxide are reacted at about 90–100° C. for a day. The reaction mixture is worked up as in Example 4, and affords a base distilling at 194-200° C. at 6 mm. pressure and a hydrochloride which melts at 172-174° C. after recrystallization from methyl ethyl ketone. The product so prepared is a polyhydro-9-anthryl beta-diethylaminoethyl ether.

Example 6

19.4 g. of anthrone is dissolved with warming in a solution of 4.6 g. of sodium in 300 cc. of absolute alcohol. 13.5 g. of beta-diethylaminoethyl chloride is added and the solution refluxed for one hour. Then an additional 13.5 g. of beta-diethylaminoethyl chloride is added and the resulting solution refluxed for two hours. The mass is poured into cold water, acidified, extracted with ether, and filtered. The aqueous filtrate is made alkaline and extracted with ether. This extract is washed and dried. The addition of alcoholic hydrogen chloride causes precipitation of 9-anthryl beta-diethylaminoethyl ether hydrochloride which, when recrystallized from methyl ethyl ketone, melts at 158-160° C.

18 g. of 9-anthryl beta-diethylaminoethyl ether in dry ether is treated with an excess of methyl iodide and placed in a refrigerator. The crystalline methiodide which slowly forms is removed by filtration and recrystallized from alcohol diluted with ether; M. P. 165-167° C.

Example 7

0.2 mole of anthrone in 300 cc. of alcohol is reduced in the presence of Raney nickel and a small amount of potassium chloroplatinate at 30-50 lbs. hydrogen pressure. After 0.4 mole of hydrogen is absorbed, the reaction is stopped, the catalyst removed by filtration, and the solution poured into a large amount of water. The fluffy precipitate is filtered, dried and recrystallized from petroleum ether. The reduced product is reacted with 20 g. of beta-dimethylaminoethyl chloride hydrochloride and 25 g. of powdered potassium hydroxide on a steam bath for four hours. The reaction mixture is worked up as in Example 4. The base thus obtained distils at 210-212° C. at 4 mm. Treatment of an ethereal solution of this base with alcoholic hydrogen chloride results in the formation of white crystals of the hydrochloride. Recrystallization from methyl ethyl ketone gives crystals which melt at 181-182° C.

Example 8

0.2 mole of anthrone is reduced as in Example 7 until 0.2 mole of hydrogen is absorbed. The catalyst is removed by filtration and the filtrate is evaporated. The residue thus obtained is reacted with 30 g. of beta-dimethylaminoethyl chloride hydrochloride and 30 g. of potassium hydroxide as in Example 7. There is obtained a base boiling at 200° C. at 4 mm. pressure, which gives a crystalline hydrochloride of M. P. 185-186° C. after recrystallization from methyl ethyl ketone. The mixed melting point of this hydrochloride with the hydrochloride of Example 7 is not depressed.

Example 9

0.2 mole of anthrone is reduced as in Example 7 until 0.6 mole of hydrogen is absorbed. The reduced product obtained from this hydrogenation is reacted with 35 g. of beta-dimethylaminoethyl chloride hydrochloride and 30 g. of potassium hydroxide as in Example 4. The base so obtained boils at 192-198° C. at 3 mm. pressure and affords a light crystalline hydrochloride of M. P. 200-201° C. The melting point of the mixture of this hydrochloride with the hydrochloride of Example 7 is 194-196° C.

Example 10

0.1 mole of anthrone is reduced as in Example 7. The reaction is stopped when 0.4 mole of hydrogen is taken up. The reduction product obtained in the usual fashion melts at 120-122° C. It is heated with 20 g. of beta-dimethylaminoethyl chloride hydrochloride and 30 g. of flake sodium hydroxide as in Example 7. The base obtained from this reaction is converted directly to the hydrochloride by treatment with alcoholic hydrogen chloride. After recrystallization from isopropanol it melts at 214-216° C. The melting point of the mixture of this hydrochloride and the hydrochloride of Example 7 is 198-200° C.

I claim:

1. A tertiary-aliphatic-aminoalkyl ether of a polynuclear carbinol of the group consisting of 9-xanthenol, 10-thiaxanthenol, 9-fluorenol, and 9,10-dihydro-9-anthrol, and salts thereof.
2. A tertiary-aliphatic-aminoalkyl ether of 9-fluorenol and salts thereof.
3. A dialkylaminoalkyl 9-fluorenyl ether and salts thereof.
4. A dialkylaminoethyl 9-fluorenyl ether and salts thereof.
5. A dialkylaminopropyl 9-fluorenyl ether and salts thereof.
6. Beta-diethylaminoethyl 9-fluorenyl ether and salts thereof.
7. Gamma-diethylaminopropyl 9-fluorenyl ether and salts thereof.
8. The process of producing a tertiary-aliphatic-aminoalkyl ether of a polynuclear carbinol of the group consisting of 9-xanthenol, 10-thiaxanthenol, 9-fluorenol and 9,10-dihydro-9-anthrol, which comprises heating a tertiary-aliphatic-aminoalkyl halide with a polynuclear carbinol and alkali.
9. The process of producing a tertiary-aliphatic-aminoalkyl fluorenyl ether which comprises heating a tertiary-aliphatic-aminoalkyl halide with 9-fluorenol and alkali.
10. $\beta$-Diethylaminoethyl 9-fluorenyl ether hydrochloride.
11. $\gamma$-Diethylaminopropyl 9-fluorenyl ether hydrochloride.
12. $\beta$-Diethylaminoethyl 9-fluorenyl ether methochloride.

JOHN W. CUSIC.

REFERENCES CITED

The following references are of record in the file of this patent:

UNITED STATES PATENTS

| Number | Name | Date |
| --- | --- | --- |
| 1,754,678 | Elberfield | Apr. 15, 1930 |
| 1,949,046 | Hartman et al. | Feb. 27, 1934 |
| 2,397,799 | Martin et al. | Apr. 2, 1946 |